United States Patent [19]

Riederer

[11] Patent Number: 5,069,012
[45] Date of Patent: Dec. 3, 1991

[54] GAP SEALING MEANS

[75] Inventor: Rudolf Riederer, Pulheim, Fed. Rep. of Germany

[73] Assignee: Gurit-Essex AG, Switzerland

[21] Appl. No.: 476,269

[22] Filed: Feb. 7, 1990

[30] Foreign Application Priority Data

Feb. 25, 1989 [DE] Fed. Rep. of Germany ....... 3905906

[51] Int. Cl.$^5$ ................................................ E04B 1/68
[52] U.S. Cl. ........................................ 52/208; 296/93; 52/403
[58] Field of Search ..................... 296/93, 201; 52/400, 52/403, 208

[56] References Cited

U.S. PATENT DOCUMENTS

| | | | |
|---|---|---|---|
| 3,659,896 | 5/1972 | Smith et al. | 296/93 |
| 4,571,278 | 2/1986 | Kunert | 52/400 |
| 4,681,794 | 7/1987 | Kunert et al. | 52/400 |
| 4,933,032 | 6/1990 | Kunert | 52/40 |
| 4,938,979 | 7/1990 | Gold | 52/208 |

FOREIGN PATENT DOCUMENTS

| | | | |
|---|---|---|---|
| 0351369 | 7/1989 | European Pat. Off. | 296/201 |
| 0325830 | 8/1989 | European Pat. Off. | 296/93 |
| 2747938 | 5/1979 | Fed. Rep. of Germany | 52/403 |
| 3518145 | 11/1986 | Fed. Rep. of Germany | 296/201 |

Primary Examiner—Richard E. Chilcot, Jr.
Attorney, Agent, or Firm—Tarolli, Sundheim & Covell

[57] ABSTRACT

In a vehicle body, the aperture for the pane or window comprises a mounting flange stepped towards the interior of the vehicle. The pane of window is adhesively fixed to that mounting flange along a peripheral edge portion. Along the edge of the mounting flange remote from the aperture for the pane or window a gap sealing member is adhesively fixed to the stepped portion of the mounting flange. The gap sealing member is an endless hollow profile member corresponding in size to the perimeter of the pane or window and is elastically deformable. The use of such a gap sealing member is much less expensive that known sealing members of this kind, offers good appearance and may be easily mounted while it effectively seals the gap between vehicle body and pane or window against dirt and moisture.

28 Claims, 2 Drawing Sheets

GAP SEALING MEANS

BACKGROUND OF THE INVENTION

1. Field of the Invention

The present invention refers to a gap sealing means adapted to seal the gap between a mounting flange of a frame, a vehicle body or the like and a pane or window mounted to said mounting flange of said frame, vehicle body or the like by means of an adhesive. Further, the invention refers to a vehicle body comprising an aperture adapted to receive a pane or window, and a pane or window mounted in the aperture of the vehicle body, said aperture comprising a circumferential mounting flange stepped towards the interior of the vehicle body and having a first portion directed to the interior of the vehicle body as well as a second portion extending perpendicularly to said first portion towards the center of the aperture, the pane or window being adhesively fixed to the second portion of the mounting flange by means of an adhesive material bead.

2. Prior Art

Conventionally, a vehicle pane or window is fixed in the frame of a vehicle body by means of a double U-profile frame member made of rubber or a similarly elastically resilient material. On the one hand, the edge of the pane or window is received in a first recess of the double U-profile facing the interior of the double U-profile frame member, and on the other hand, the second recess directed away from the double U-profile frame member engages the edges of a body frame, of a flange or the like of the vehicle body to thereby fix the pane or window in its desired position.

More and more, to so-called direct mounting of vehicle panes or windows is used in which an edge portion of the pane or window is glued to the edges of a body frame, of a flange or the like e.g. of a vehicle body by means of a suitable adhesive material. Thereby, a bead of a adhesive and sealing substance which permanently remains elastic is applied along the edge of the pane or window to be mounted. Thereafter, the thus prepared pane or window is put into the frame or onto the mounting flange and pressed thereagainst.

A problem arising in performing this method is that the pane or window exhibits certain size tolerances with the consequence that the aperture in the vehicle body must be designed somewhat greater than the nominal or standard dimensions of the pane or window to be mounted therein in order to take into account that possibly a pane or window will have to be inserted which is wider than a standard or nominally sized pane or window. Thereby, a gap occurs between the edge of the pane or window and the vehicle body having more or less width. This gap not only is aesthetically a nuisance, but it enables dirt and moisture to penetrate between the edge of the pane or window and the vehicle body and to settle there and it creates noise due to the head wind which can be heard in the interior of the vehicle.

According to the prior art, different methods have been disclosed to try to avoid this disadvantage.

The German published Patent Application No. 20 38 016 discloses a profiled edge member which has to be pushed over the edge of the pane or window and which comprises a channel portion enclosing an edge portion of the pane or window. A front strip portion extends from the front wall of the channel portion which covers the front wall and which is larger than the depth dimension of the front wall such that its free edge protrudes in such an amount to rest against the facing portion of the vehicle body when the pane-profile member-structure is inserted into the aperture of the vehicle body whereby the frontal strip portion covers the gap between the edge of the pane or window and the mounting flange of the vehicle body. Such a profile member is very expensive and requires a cumbersome mounting process to fit over the edge of the pane or window; thus, it is not suitable for an automated preparation of the panes or windows which is usual in these days.

Another solution is disclosed in the published European Patent Application No. 0 073 350. According to this publication, a profiled frame is provided which is mounted on the edge of the pane or window to be fixed to the vehicle body. The profiled frame has, seen in cross section, a portion located beyond the periphery of the pane or window and being plastically deformable under the influence of a mechanical force. With this design, an adaptable pane-frame-structure should be provided which exactly fits into the aperture of the vehicle body. The disadvantage of this solution is besides the even higher price of the profiled frame that an additional operation step is required, namely the plastic deformation of the profiled frame before the pane or window can be inserted into the vehicle body. Furthermore, in the case of repair, the replacement of such a pane or window is very expensive.

Similar solutions are disclosed in the published European Patent Application No. 0 128 837, the published British Patent Application No. 2 049 010 and the U.S. Pat. No. 4,441,755. In any case, a profiled member is used to cover the gap between the edge of the pane or window and the vehicle body, said profiled member having a covering portion for spanning the gap and a anchoring portion which is inserted or pushed into the adhesive bead or connected thereto otherwise. These designs are fairly expensive as well, protrude too far over the surface of the pane or window in the case of the above mentioned British and U.S. documents and require a cumbersome mounting process in exactly the proper moment when the adhesive and sealing substance still is plastic, but shortly before curing. Also with these solutions, in the case of repair, the replacement of such a pane or window is very expensive.

OBJECTS OF THE INVENTION

It is an object of the present invention to provide a gap sealing means adapted to seal the gap between a mounting flange of a frame, a vehicle body or the like and a pane or window mounted to said mounting flange of said frame, vehicle body or the like by means of an adhesive which is considerably less expensive than known profiles used for this purpose.

It is a further object of the present invention to provide a gap sealing means adapted to seal the gap between a mounting flange of a frame, a vehicle body or the like and a pane or window mounted to said mounting flange of said frame, vehicle body or the like by means of an adhesive which can be mounted to the frame, the vehicle body or the like with much less effort and considerably quicker than known profiles used for this purpose.

It is a still further object of the present invention to provide a gap sealing means adapted to seal the gap between a mounting flange of a frame, a vehicle body or the like and a pane or window mounted to said mounting flange of said frame, vehicle body or the like by means of an adhesive which provides an essentially even, dirt-tight and moisture-tight seal between the pane or the window and the frame, the vehicle body or the like even in the case when considerable dimension tolerances of the pane or window are present.

SUMMARY OF THE INVENTION

The invention provides a gap sealing means adapted to seal the gap between a mounting flange of a frame, a vehicle body or the like and a pane or window mounted to said mounting flange of said frame, vehicle body or the like by means of an adhesive. The gap sealing member comprises an elongate elastically deformable closed hollow profile member having a length which essentially corresponds to the perimeter of said pane or window. It is adhesively fixed to an inner surface of the mounting flange.

In a simple embodiment, the hollow profile member has a tube-like shape with circular cross section. If the requirements as far as aesthetics and sealing effect are concerned are higher, the hollow profile member has an oval or essentially triangular cross-sectional shape.

Particularly good results with regard to the aesthetics and the sealing effect can be achieved when the hollow profile member comprises, over its cross-sectional circumference, a first portion having a first wall thickness and a second portion having a second wall thickness which is less than said first wall thickness. Thereby, the outside of the first portion of the hollow profile member may comprise an elongate groove which is open to the outside of the hollow profile member and contains an adhesive material. Thus, the hollow profile member can be fixed to the frame or mounting flange by simply pressing it to the latter.

To facilitate the removal of a pane or window, a cutting wire or string can be provided in the interior of the hollow profile member.

Preferably, the hollow profile member consists of an ethylene-propylene-diene elastomer (EPDM) material which may be colored in order to suit the paint of the vehicle. As is well known, these materials have a particularly good resistance to ultraviolet radiation.

The invention further provides a vehicle body comprising an aperture adapted to receive a pane or window and a pane or window mounted in this aperture of the vehicle body. The aperture comprises a circumferential mounting flange stepped towards the interior of the vehicle body. The mounting flange has a first portion directed to the interior of the vehicle body as well as a second portion extending perpendicularly to said first portion towards the center of the aperture.

The pane or window is adhesively fixed to said second portion of the mounting flange by means of an adhesive material bead running in a certain distance from the circumferential edge of the pane or window. Further, there is provided a gap sealing means comprising an elongated elastically deformable closed hollow profile member having a length which essentially corresponds to the perimeter of the pane or window. The hollow profile member is adhesively fixed to the inner surface of the mounting flange in a region where the first and second portions of the mounting flange adjoin.

The dimensions of the hollow profile member, thereby, are chosen such that, the pane or window being mounted in the frame or vehicle body, the hollow profile member preferably is elastically deformed by a peripheral edge of the pane or window.

BRIEF DESCRIPTION OF THE DRAWINGS

In the following, two embodiments of the invention will be further described, with reference to the accompanying drawings, in which.

DETAILED DESCRIPTION OF THE EMBODIMENTS

Figure 1:
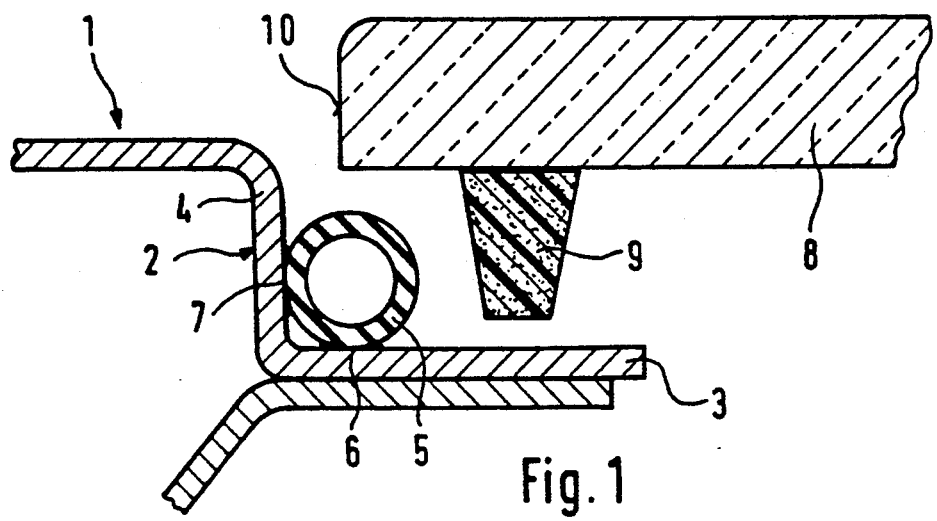
FIG. 1 in a first embodiment, shows a partial sectional view of a mounting flange of a vehicle body and of a pane immediately prior to fixing it to the flange.
Figure 2:
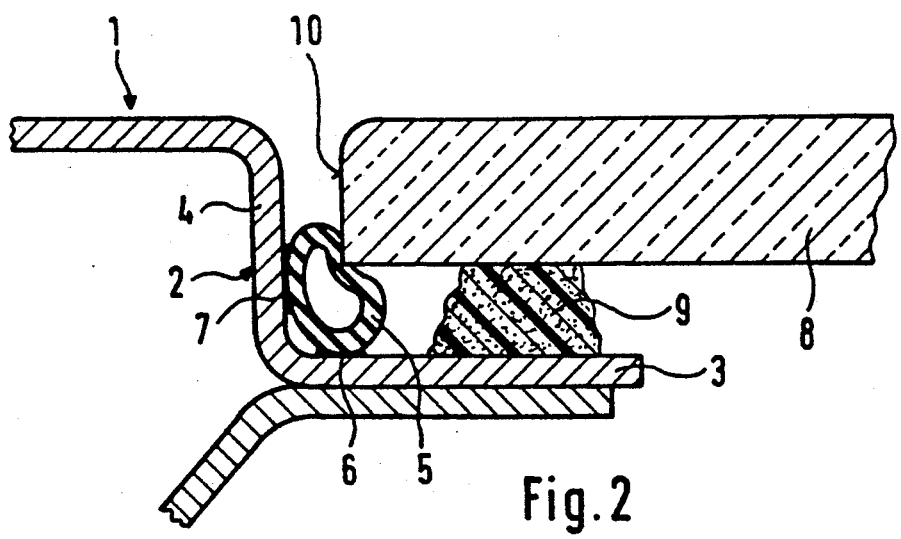
FIG. 2 in said first embodiment, shows a partial sectional view of a mounting flange of a vehicle body and of a pane after fixing it to the flange.

A first embodiment of the gap sealing means and of a vehicle body structure is partially shown in FIGS. 1 and 2 in a sectional view. Reference numeral 1 generally designates a vehicle body, only a small fraction thereof being shown, i.e. the region of the edge portion of the aperture adapted to receive a pane or window. The vehicle body comprises a mounting flange 2. The mounting flange 2 comprises a first wall portion 4 extending perpendicularly from the vehicle body 1 towards the interior thereof, and a second wall portion 3 adjoining the free edge of said first wall portion 4 and extending perpendicularly from said first wall portion 4 towards the center of the aperture in the vehicle body 1. A gap sealing member 5 is located on the outside of said mounting flange 2 and runs close to and along the edge between said first wall portion 4 and said second wall portion 3.

The gap sealing member 5 is of tube-like design and comprises, according to the embodiment shown in FIG. 1, the shape of a hollow profile member having circular cross-section. The gap sealing member 5 is adhesively fixed to said first wall portion 4 along a strip-like portion 7 and to said second wall portion 3 along a strip-like portion 6, e.g. by means if a suitable adhesive material.

The gap sealing member 5 is made of elastically deformable material, preferably of an ethylene-propylene-diene elastomer material (EPDM). It is well known in the art that this material is characterized by a particularly pronounced resistance to ultraviolet radiation. However, within the scope of the present invention, it is possible to use other elastic materials and a person skilled in the art will not have any difficulties in choosing a suitable material.

Reference numeral 8 designates a pane to be fixed to the mounting flange 2. According to FIG. 1, the pane 8 is shown in a position taken shortly before it is inserted into the window aperture of the vehicle body 1. A bead of adhesive material 9 is applied onto the surface of the pane 8 serving to fix the pane 8 to the mounting flange 2 of the vehicle body 1. The adhesive material 8 can comprise, for instance, a moisture-curing adhesive and sealing substance which permanently remains elastic. Suitable substances are known to every person skilled in the art and need not to be discussed here. However, it is also possible to make use of a chemically curing two component adhesive and sealing material which permanently remains elastic.

As can be seen in FIG. 1, the bead of adhesive material 9 is located in a certain distance from the edge 10 of the pane 8. Thus, it is avoided that the adhesive and sealing material 9 is pressed against the gap sealing member 5 after the pane 8 having been mounted and pressed into position. This measure ensures that the gap sealing member 5 doesn't come into contact with the adhesive and sealing material 9 so that the gap sealing member is not pasted up and impaired in its elastic behaviour.

According to FIG. 2, the pane 8 is shown in its mounted position. It may be clearly seen from FIG. 2 that, on the one hand, the bead of adhesive material 9 has been plastically deformed and, on the other hand, that the gap sealing member 5 rests on the edge 10 of the pane 8, but is in contrary to the bead 9 elastically deformed. Thereby, the pane 8 is rigidly fixed to the second wall portion 3 of the mounting flange 2 of the vehicle body 1 and the gap between the edge 10 of the pane 8 and the first wall portion 4 of the mounting flange 2 which can be wider or narrower, depending on size tolerances of the pane 8 and/or the aperture in the vehicle body 1, is effectively sealed. Thus, no dirt or moisture can penetrate and noise generated by the head wind occurring due to turbulences in the region of the gap are nearly fully eliminated.

Figure 3:
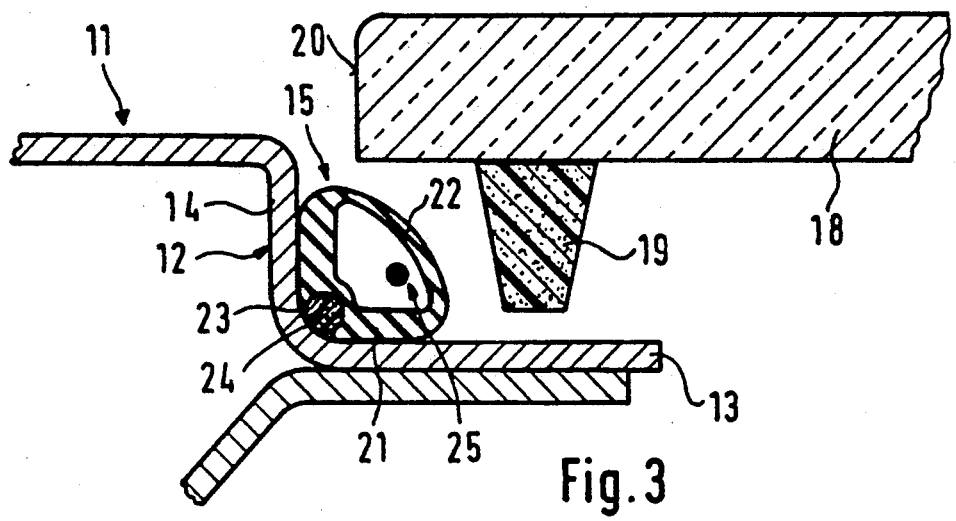
FIG. 3 in a second embodiment, shows a partial sectional view of a mounting flange of a vehicle body and of a pane immediately prior to fixing it to the flange.
Figure 4:
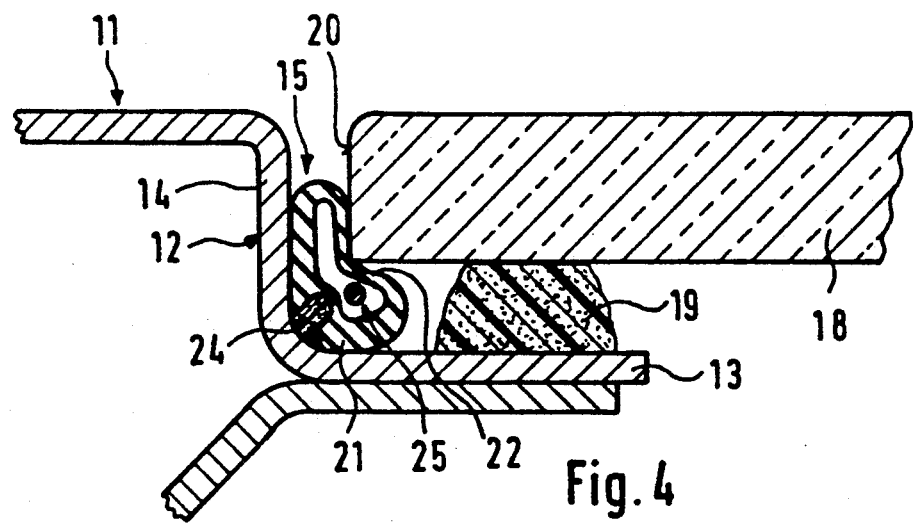
FIG. 4 in said second embodiment, shows a partial sectional view of a mounting flange of a vehicle body and of a pane after fixing it to the flange.

In FIGS. 3 and 4, a second embodiment of the gap sealing member according to the invention is shown. Correspondingly as described in connection with FIGS. 1 and 2, reference numeral 11 generally designates a vehicle body, only a small fraction thereof being shown, i.e. the region of the edge portion of the aperture adapted to receive a pane or window. The vehicle body 11 comprises a mounting flange 12. The mounting flange 12 comprises a first wall portion 14 extending perpendicularly from the vehicle body 11 towards the interior thereof, and a second wall portion 13 adjoining the free edge of said first wall portion 14 and extending perpendicularly from said first wall portion 14 towards the center of the aperture in the vehicle body 11.

A gap sealing member 15 is located on the outside of said mounting flange 12 and runs close to and along the edge between said first wall portion 14 and said second wall portion 13. The gap sealing member 15 is of tube-like design and comprises, according to the embodiment shown in FIG. 3, the shape of a hollow profile member having essentially triangular cross-section.

The gap sealing member 15 is made of elastically deformable material, preferably of an ethylene-propylene-diene elastomer material (EPDM). It is well known in the art that this material is characterized by a particularly pronounced resistance to ultraviolet radiation. However, within the scope of the present invention, it is possible to use other elastic materials and a person skilled in the art will not have any difficulties in choosing a suitable material.

Reference numeral 18 designates a pane to be fixed to the mounting flange 12. According to FIG. 3, the pane 18 is shown in a position taken shortly before it is inserted into the window aperture of the vehicle body 11. A bead of adhesive material 19 is applied onto the surface of the pane 18 serving to fix the pane 18 to the mounting flange 12 of the vehicle body 11. Again, the adhesive material 18 can comprise, for instance, a moisture-curing adhesive and sealing substance which permanently remains elastic. However, it is also possible to make use of a chemically curing two component adhesive and sealing material which permanently remains elastic.

As can be seen in FIG. 3, the bead of adhesive material 19 is again located in a certain distance from the edge 20 of the pane 18. Thus, is is avoided that the adhesive and sealing material 19 is pressed against the gap sealing member 15 after the pane 18 having been mounted and pressed into position. This measure ensures that the gap sealing member 15 doesn't come into contact with the adhesive and sealing material 19 so that the gap sealing member 15 is not pasted up and impaired in its elastic behaviour.

The embodiment shown in FIGS. 3 and 4 comprises a gap sealing member 15 having the shape of a closed hollow profile body with a wall thickness varying over its circumferential cross section. As can be seen from the drawings, the gap sealing member 15 comprises a first portion 21 having a greater wall thickness and a second portion having a smaller wall thickness. The first portion 21 having that larger wall thickness comprises a groove 23 open towards the outside of the gap sealing member 15 and extending all over the length of the hollow profile member 15. The groove 23 receives a bead 24 of adhesive material. In the interior of the hollow profile member, a cutting wire or string 25 can be provided as is known in the art per se in order to facilitate the removal of the pane 18 when it has been damaged.

According to FIG. 4, the pane 18 is shown in its mounted position. It may be clearly seen from FIG. 4 that, on the one hand, the bead of adhesive material 19 has been plastically deformed and, on the other hand, that the gap sealing member 15 rests on the edge 10 of the pane 8, but is in contrary to the bead 19 elastically deformed.

Before the pane 18 has been mounted, the hollow gap sealing profile member 15 has been pressed into the corner between the first wall portion 14 and the second wall portion 13. Thereby, the adhesive material 24 contained in the groove 23 is squeezed out of the groove 23 and fixes the first thicker wall portion 21 of the hollow profile member 15 to the first wall portion 14 and the second wall portion 13. The thinner wall portion 22 is easily deformed by the edge 20 of the pane 18 and closely fits the contour thereof to effectively seal the space between the gap sealing member 15 and the bead 19.

Thereby, the pane 18 is rigidly fixed to the second wall portion 13 of the mounting flange 12 of the vehicle body 11 and the gap between the edge 20 of the pane 18 and the first wall portion 14 of the mounting flange 12 which can be wider or narrower, depending on size tolerances of the pane 18 and/or the aperture in the vehicle body 11, is effectively sealed. Thus, no dirt or moisture can penetrate and noise generated by the head wind occurring due to turbulences in the region of the gap are nearly fully eliminated.

The hollow gap sealing member 5 and 15, respectively, can be an endless ring whereby the two ends are adhesively fixed to each other in a butt-joint. Thus, no seam is visible. The cutting wire 25 inserted into the hollow gap sealing member 15 can be connected together at its end e.g. by welding or in another suitable manner. Thus, it is possible to grasp the wire 25 by means of an acute tool having a hooklet at its end and drawn off the interior of the hollow gap sealing member 15. Thereby, the tool is pushed through the bead 19 and through the wall of the gap sealing member 15 until the hooklet has caught the wire 25 and then the tool is drawn back to remove the cutting wire 25 from the interior of the gap sealing member 15. Thereafter, the wire 25 is clamped into a drawing tool and fully removed whereby the hollow gap sealing member 15 and the bead 19 is cut. Finally, the pane 18 can be removed from the vehicle body 11.

The hollow profile member of the gap sealing means according to the invention appears optically very flat when the pane is in its mounted position, particularly the embodiment according to FIGS. 3 and 4. Depending on the size of the pane 18, the depth of the remaining gap amounts to only 1-2 mm. This is favourable not only for the appearance but also for the aerodynamic characteristics of the vehicle and the noise generation. In special applications, a hollow profile member can be used which has rounded edges and/or bevel cuts.

The gap sealing member according to the invention is usable for all kinds of fixed vehicle panes like windshields, rear windows and fixed side windows. Its manufacture is considerably cheaper than comparable gap sealing means known in the art.

Due to the fact that the hollow profile member 5 and 15, respectively, is not fixed to the pane since the glass rests thereon from upwards, the proposed design is very well suited for the automated mounting of vehicle windows. Particularly, the automated fixing of a gap sealing member in the mounting flange of a window aperture by means of a robot or the like is made possible for the first time easily and efficiently.

The material of the hollow profile member 5 and 15, respectively, can be colored in order that it harmonizes with the paint of the vehicle. A further advantage may be seen in the fact that the hollow profile member 5 and 15, respectively, may be further elastically deformed even if the pane is already mounted. This is of particular importance in the case where the pane 8 or 18 is not water-tightly mounted such that additional sealing substance has to be inserted into the space between adhesive bead 9 and 19, respectively, and hollow profile member 5 and 15, respectively.

What I claim is:

1. A gap sealing means for providing a seal between a mounting flange of a vehicle body and a windowpane mounted to said mounting flange, said mounting flange including a first wall portion and a second wall portion extending transverse to said first wall portion, said second wall portion of said mounting flange extending generally parallel to said windowpane, said windowpane being mounted by means of a bead of adhesive material for securing said windowpane to said mounting flange, said bead of adhesive material being disposed between said second wall portion and said windowpane, and said bead of adhesive material being spaced inwardly of the periphery of said windowpane and providing a gap between said second wall portion and said windowpane, said gap sealing means comprising:
an elongate elastically deformable closed hollow profile member for sealing between said first wall portion of said mounting flange and said windowpane and for blocking contaminants from entering the gap between said second wall portion and said windowpane, said hollow profile member being spaced apart from said bead of adhesive material and having a length which essentially corresponds to the length of the perimeter of said windowpane.

2. A gap sealing means according to claim 1 in which said hollow profile member has a tube-like shape.

3. A gap sealing means according to claim 1 in which said hollow profile member has a circular cross-sectional shape.

4. A gap sealing means according to claim 1 in which said hollow profile member has an oval cross-sectional shape.

5. A gap sealing means according to claim 1 in which the wall thickness of said hollow profile member varies over its cross-sectional circumference.

6. A gap sealing means according to claim 5 in which said hollow profile member comprises, over its cross-sectional circumference, a first portion having a first wall thickness and a second portion having a second wall thickness which is less than said first wall thickness.

7. A gap sealing means according to claim 6 in which said first and second portions each extend over essentially 50% of the cross-sectional circumference of said hollow profile member.

8. A gap sealing means according to claim 1 in which a cutting wire is provided in the interior of said hollow profile member.

9. A gap sealing means according to claim 1 in which said hollow profile member consists of an ethylene-propylene-diene elastomer (EPDM) material.

10. A gap sealing means according to claim 1 in which said hollow profile member is colored.

11. A gap sealing means according to claim 1 in which said hollow profile member has the shape of an endless ring.

12. A gap sealing means according to claim 11 in which the two ends of said hollow profile member are adhesively fixed to each other in a butt-joint.

13. A gap sealing means adapted to seal the gap between a mounting flange of a vehicle body and a windowpane mounted to said mounting flange by means of an adhesive, said gap sealing means comprising an elongate elastically deformable closed hollow profile member having a length which essentially corresponds to the perimeter of said windowpane and being adhesively fixed to an inner surface of said mounting flange, the wall thickness of said hollow profile member varying over its cross-sectional circumference, said hollow profile member comprising, over its cross-sectional circumference, a first portion having a first wall thickness and a second portion having a second wall thickness which is less than said first wall thickness, the outside of said first portion of said hollow profile member comprising an elongate groove which is open to the outside of said hollow profile and contains an adhesive material.

14. A vehicle body comprising:
a circumferential mounting flange stepped towards the interior of said vehicle body and defining an aperture adapted to receive a windowpane, said circumferential mounting flange having a first portion directed to the interior of said vehicle body and a second portion extending perpendicularly to said first portion towards the center of said aperture;
a windowpane mounted in said aperture of said vehicle body;
a bead of adhesive material adhesively fixed between said windowpane and said second portion of said mounting flange, said bead of adhesive material running in a certain distance from the circumferential edge of said windowpane; and
a gap sealing means comprising an elongate elastically deformable closed hollow profile member having a length which essentially corresponds to the length of the perimeter of said windowpane and being adhesively fixed to the inner surface of said mounting flange in a region where said first and second portions of said mounting flange adjoin.

15. A vehicle body according to claim 14 in which said hollow profile member is elastically deformed by a peripheral edge of said windowpane.

16. A vehicle body according to claim 14 in which said hollow profile member abuts on a peripheral edge of said windowpane.

17. A vehicle body according to claim 14 in which said hollow profile member has a tube-like shape.

18. A vehicle body according to claim 14 in which said hollow profile member has a circular cross-sectional shape.

19. A vehicle body according to claim 14 in which said hollow profile member has an oval cross-sectional shape.

20. A vehicle body according to claim 14 in which the wall thickness of said hollow profile member varies over its cross-sectional circumference.

21. A vehicle body according to claim 20 in which said hollow profile member comprises, over its cross-sectional circumference, a first portion having a first wall thickness and a second portion having a second wall thickness which is less than said first wall thickness.

22. A vehicle body according to claim 21 in which said first and second portions each extend over essentially 50% of the cross-sectional circumference of said hollow profile member.

23. A vehicle body according to claim 14 in which a cutting wire is provided in the interior of said hollow profile member.

24. A vehicle body according to claim 14 in which said hollow profile member consists of an ethylene-propylene-diene elastomer (EPDM) material.

25. A vehicle body according to claim 14 in which said hollow profile member is colored.

26. A vehicle body according to claim 14 in which said hollow profile member has the shape of an endless ring.

27. A vehicle body according to claim 26 in which the two ends of said hollow profile member are adhesively fixed to each other in a butt-joint.

28. A vehicle body comprising:
a circumferential mounting flange stepped towards the interior of said vehicle body and defining an aperture adapted to receive a windowpane, said circumferential mounting flange having a first portion directed to the interior of said vehicle body and a second portion extending perpendicularly to said first portion towards the center of said aperture;
a windowpane mounted in said aperture of said vehicle body;
said windowpane being adhesively fixed to said second portion of said mounting flange by means of an adhesive running in a certain distance from the circumferential edge of said windowpane; and
a gap sealing means comprising an elongate elastically deformable closed hollow profile member having a length which essentially corresponds to the perimeter of said windowpane and being adhesively fixed to the inner surface of said mounting flange in a region where said first and second portions of said mounting flange adjoin, the wall thickness of said hollow profile member varying over its cross-sectional circumference, said hollow profile member comprising, over its cross-sectional circumference, a first portion having a first wall thickness and a second portion having a second wall thickness which is less than said first wall thickness, the outside of said first portion of said hollow profile member comprising an elongate groove which is open to the outside of said hollow profile and contains an adhesive material.

* * * * *